Feb. 3, 1948. W. T. WATSON 2,435,255
HANDLE OPERATED BRAKE
Filed Nov. 15, 1945  2 Sheets-Sheet 1
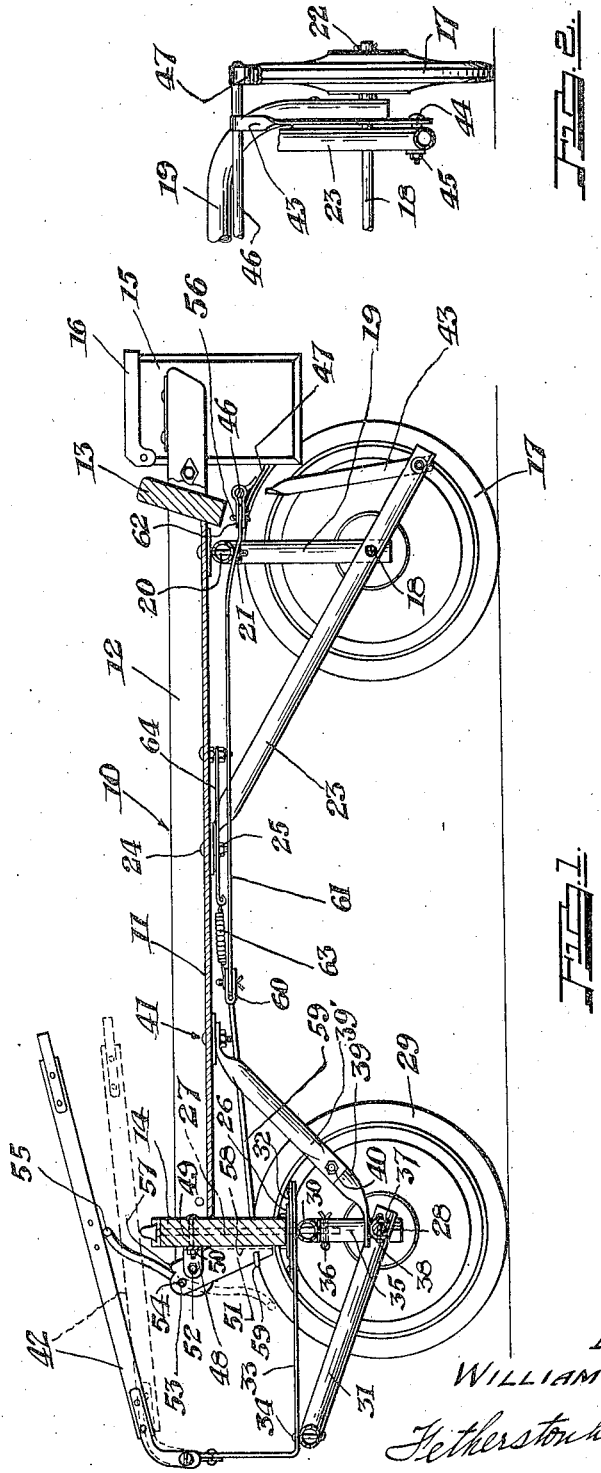
INVENTOR
WILLIAM T. WATSON
BY  ATTORNEYS

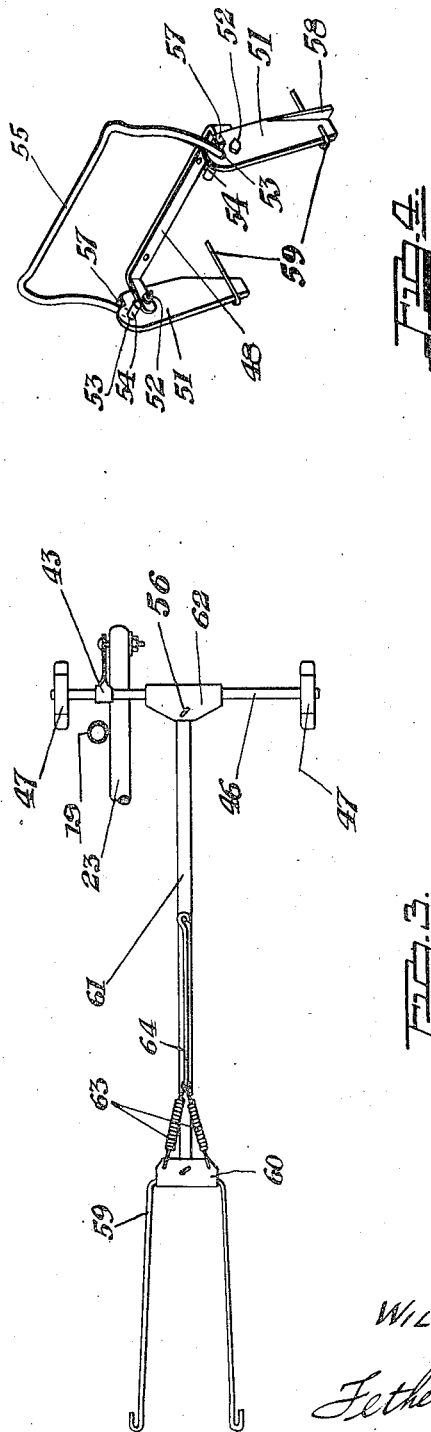

Patented Feb. 3, 1948

2,435,255

UNITED STATES PATENT OFFICE 2,435,255

HANDLE OPERATED BRAKE

William Thomas Watson, West Vancouver, British Columbia, Canada

Application November 15, 1945, Serial No. 628,864

3 Claims. (Cl. 280—88)

This invention relates to children's hand drawn wagons and is concerned with providing improved means for actuating brakes by means of the steering lever, an arrangement of this general type being illustrated in my prior United States Patent 1,710,849, issued April 30, 1929.

The object of the present invention is to provide an arrangement of the type described which is simpler and more durable than has heretofore been proposed.

A further object of the invention is to provide brakes and actuating means in two units, one connected to each of two shipping units.

A further object of the invention is to provide an arrangement of the type described in which the member contacted by the steering handle for application of the brakes may readily be disengaged.

A further object of the invention is to provide an arrangement of the type described which permits a compact folding, for packing purposes, of the member engaged by the steering lever to actuate the brakes.

Other objects and features of the invention will appear from the accompanying description with reference to the drawings in which:

Figure 1 is a longitudinal section of a hand wagon according to the invention,

Figure 2 is a partial rear view illustrating the suspension of the brake beam and of the brake shoes, Figure 3 is an elevation showing the connection through the brake beam, some of the parts shown in the upper part of this figure being omitted from the lower part thereof, and Figure 4 is an enlarged oblique view of the folding saddle.

The wagon indicated generally by the reference numeral 10 has a floor 11, side walls 12, an inclined rear wall 13, and a front wall or bolster 14. As appears from Figure 1, the side walls 12 project to the rear of the rear wall 13 and support a box 15 having a hinged cover 16.

Rear wheels 17 are mounted on axle 18 which is journalled in the ends of a U-shaped tubular bracket 19 secured to the floor 11 in front of the real wall 13 by bolts 20 and nuts 21. The wheels 18 are secured in position by the usual cotter pins 22.

The U-shaped bracket 19 is supported by two struts 23 arranged one at each side of the vehicle, and having one end secured to the floor 11, by a bolt 24 and nut 25, while the axle 18 passes through a suitable hole formed in each strut 23 between its ends so that the strut projects to the rear of the axle 18 as illustrated in Fig. 1.

The front suspension is of the turntable type, the bolster 14 carrying a bearing plate 26 and being connected by means of a king pin 27 to the turnable wheel unit which consists of axle 28, wheels 29, a tubular U-shaped bracket 30 corresponding to the rear bracket 19, a tubular steering yoke 31, lower bearing plate 32 and a steering arm 33. The axle 28 is journalled in the ends of the bracket 30 and the yoke 31 and the forward end of the latter is connected by a rivet 34 to the steering arm 33. The lower bearing plate 32 is carried by the steering arm 33 and the king pin 27 extends through both bearing plates and the steering arm 33 and through the bracket 30 into a tubular member 35 which fits between the bracket 30 and the axle 28. A cotter pin 36 extends through the tubular member 35 and through the king pin 27. At its lower end the tubular member 35 is provided with a foot 37 which straddles the axle and is connected to it by a pin 38.

The turnable wheel unit is supported by a strut 39 having its forward end slipped over the foot 37 as shown in Figure 1, so that the unit may pivot in relation to the strut. The other end of the strut 39 is bolted to the floor 11 of the wagon near one side thereof and a wing 39' connected to the strut at 40 is bolted to the floor 11 at 41.

The steering arm 33 is extended upwardly as shown in Figure 1, and is hinged to a steering handle 42 which, in the usual way, extends to the rear and crosses the bolster 14.

As set forth above, each strut 23 extends to the rear of the axle 18. As shown in Figure 1, an arm 43 is pivotally connected by means of the bolt 44 and nut 45 to each such rearward extension of a strut 23 and the arms 43 are spot welded at the other end to a brake beam 46 arranged to the rear of the axle 18 and substantially parallel to it. At each end the brake beam 46 carries a shoe 47 rigidly connected to it as by spot welding. The arms 43 are of such length and the shoes are set at such an angle that when the beam 46 is forced towards the U-shaped bracket 19, the shoes are caused to engage the tire of the wheels 17.

The beam 46 is forced towards the bracket 19 by the following means:

A U-shaped bracket 48 is secured to the front face of the bolster 14 by bolts 49 and nuts 50 and the two wings of the U extending towards the front each pivotally support a lever 51 at 52. At a point above the pivot point 52 each lever 51 is provided with a hole 53 adapted to receive an inturned end 54 of a saddle bar 55 and, at another point which is above the pivot point 52 and to the rear of the hole 53, each lever 51 is provided with a stop 57 adapted to engage the saddle bar 55 so that, when the latter is depressed by the steering handle 42, it causes each lever 51 to pivot at the point 52 thus forcing the lower end of each lever 51 towards the front. Such lower end of each bracket 51 is provided with a wing 58 adapted to bear on the front wall of the bolster 14 and is engaged by one end of a loop 59 passed through a cleat 60 as shown in Fig. 3. The latter is pivotally connected to a rod 61 which in turn is pivotally connected to a second cleat 62 engaging the brake beam 46. Thus the brakes are applied on pivoting the levers 51 sufficiently to draw the loop 59 towards the front of the wagon. The brakes are returned to the disengaged position by the springs 63, each connected at one end to the cleat 60 and, at the other end, to a link 64 secured to the underside of the floor 11.

Thus an arrangement is provided in which the brakes are mounted in a simple inexpensive manner on a reward extension of the struts supporting the rear axle and the brakes are simply actuated by depressing the steering lever to pivot the levers 51 by means of the saddle bar 55. For shipping purposes, or to prevent undesired application of the brakes, the saddle bar 55 may be pivoted towards the front in relation to the levers 51 and then downwardly so that it is clear of the handle 42.

At the same time an arrangement is provided in which the brakes and their actuating mechanism are not disturbed by the dismantling of the wagon for shipping and subsequent assembly remote from the factory. It is customary for shipping purposes to break wagons into a series of units based respectively on the wheels, the front axle, the rear axle, the steering handle and the body. According to the present invention the mechanism is grouped into two units, one attached to each of two of the above shipping units. Thus, one unit carried by the body consists of the parts illustrated in Figure 4 and the rod 61, cleat 60, spring 63 and link 64, and the other unit carried by the rear axle shipping unit consists of the cleat 62, beam 46, shoes 47 and arms 43. The two units are simply connected by means of a cotter pin 56 shown in Figure 3.

What I claim is:

1. A wagon comprising in combination a body, a front axle mounted to pivot about a vertical axis, wheels carried by said axle, a steering yoke connected to said axle, a steering handle extending to the rear over said body and hingedly connected to said yoke to control pivoting of said axle, a rear axle, wheels carried by said rear axle, two struts spaced apart and connected at one end to said body and extending to the rear of said axle, each strut being connected between its ends to said rear axle, two arms each pivotally connected at one end to a rearward strut extension, a brake beam extending transversely of said wagon to the rear of said axle and carried at the other end of said arms, two brake shoes carried by said beam, one in line with each rear wheel and means actuated by depression of said steering handle to draw said brake beam towards the front of said wagon to engage said brake shoes.

2. A wagon comprising in combination a body, a front axle mounted to pivot about a vertical axis, wheels carried by said axle, a steering yoke connected to said axle, a steering handle extending to the rear over said body and hingedly connected to said yoke to control pivoting of said axle, a rear axle, wheels carried by said axle, a brake beam mounted to oscillate longitudinally of the wagon, two brake shoes carried by such beam one in line with each rear wheel, at least one lever pivotally mounted between its ends on a pivot connected to and extending transversely of said body, means connecting one end of such lever to said brake beam to move the latter towards the front of the wagon to engage said brake shoes with the respective rear wheels on pivoting of such end of such lever towards the front of said wagon, and a saddle member positioned to be engaged by said steering handle, said saddle member being pivotally connected to said lever and adapted to engage means in connection therewith to pivot the same to engage said brakes when said saddle is depressed by said steering handle.

3. A wagon comprising in combination a body, a front axle mounted to pivot about a vertical axis, wheels carried by said axle, a steering yoke connected to said axle, a steering handle extending to the rear over said body and hingedly connected to said yoke to control pivoting of said axle, a rear axle, wheels carried by said rear axle, two struts spaced apart and connected at one end to said body and extending to the rear of said axle each strut being connected between its ends to said rear axle, a brake beam extending transversely of said wagon to the rear of said axle, two arms each pivotally connected at one end to a rearward strut extension and rigidly connected at the other end to said brake beam, two brake shoes carried by said beam, one in line with each rear wheel, at least one lever pivotally mounted between its ends on a pivot connected to and extending transversely of said body, means connecting one end of such lever to said brake beam to move the latter towards the front of the wagon to engage said brake shoes with the respective rear wheels on pivoting of such end of such lever towards the front of said wagon, and a saddle member positioned to be engaged by said stering handle, said saddle member being pivotally connected to said lever and adapted to engage means in connection therewith to pivot the same to engage said brakes when said saddle is depressed by said steering handle.

WILLIAM THOMAS WATSON.

REFERENCES CITED

The following references are of record in the file of this patent:

UNITED STATES PATENTS

| Number | Name | Date |
| --- | --- | --- |
| 1,710,849 | Watson | Apr. 30, 1929 |